United States Patent [19]

Takago et al.

[11] Patent Number: 5,312,885
[45] Date of Patent: May 17, 1994

[54] CURABLE ORGANOSILOXANE-BASED COMPOSITION

[75] Inventors: Toshio Takago; Hiroshi Inomata; Shinichi Sato; Hitoshi Kinami; Hirofumi Kishita; Noriyuki Koike; Takashi Matsuda, all of Gunma, Japan

[73] Assignee: Shin-Etsu Chemical Co., Ltd., Tokyo, Japan

[21] Appl. No.: 38,600

[22] Filed: Mar. 23, 1993

[30] Foreign Application Priority Data

Mar. 24, 1992 [JP] Japan .................................. 4-097090

[51] Int. Cl.$^5$ .............................................. C08G 77/06
[52] U.S. Cl. ........................................ 528/15; 528/35; 528/42
[58] Field of Search ............................ 528/15, 35, 42

[56] References Cited

U.S. PATENT DOCUMENTS 4,961,963 10/1990 Peters ........................................ 528/15
4,980,443 12/1990 Kendziorski et al. ................. 528/42
5,138,009 8/1992 Inoue ....................................... 528/15

*Primary Examiner*—Melvyn I. Marquis
*Attorney, Agent, or Firm*—Millen, White, Zelano & Branigan

[57] ABSTRACT

Disclosed is an organosiloxane polymer-based composition curable by the mechanism of the hydrosilation reaction between silicon-bonded vinyl groups in a vinylsilyl-terminated perfluoropolyalkylene or perfluoropolyalkylene polyether compound and silicon-bonded hydrogen atoms in a hydrosilyl-terminated perfluoropolyalkylene or perfluoropolyalkylene polyether compound as promoted by a catalyst. Different from conventional platinum compounds as the catalyst for the hydrosilation reaction, the catalyst in the inventive composition is a complex compound of rhodium such as tris(triphenylphosphine) rhodium chloride, rhodium acetate dimer and rhodium acetylacetonate so that the composition is imparted with greatly improved storage stability without viscosity increase over months at room temperature but without affectibg the curability at an elevated temperature.

4 Claims, No Drawings

CURABLE ORGANOSILOXANE-BASED COMPOSITION

BACKGROUND OF THE INVENTION

The present invention relates to a curable organosiloxane-based composition or, more particularly, to an organosiloxane-based composition curable by the mechanism of addition reaction between silicon-bonded hydrogen atoms and aliphatically unsaturated hydrocarbon groups bonded to the silicon atoms having usefulness as a sealant or coating agent as well as for the preparation of various molded and shaped articles with excellent workability and storability by virtue of the excellent curability by heating at 70° to 150° C. along with good storability at room temperature over a long period of several months or even longer without increase in the consistency or the phenomenon of gelation.

It is well established in the silicone industry that an organopolysiloxane having a plurality of vinyl groups bonded to the silicon atoms and an organohydrogenpolysiloxane having a plurality of hydrogen atoms directly bonded to the silicon atoms jointly pertain to the so-called addition reaction or hydrosilation reaction in the presence of a trace amount of a platinum compound as a catalyst for the reaction so that a composition comprising these ingredients can be cured by forming crosslinks between the polysiloxane molecules. The platinum compound most conventionally used in the above mentioned purpose is chloroplatinic acid in the form of a solution in an alcohol such as isopropyl alcohol, of which at least a part of the ligands to the platinum atom may optionally be modified with an alcohol or replaced with ethylene molecules, or in the form of a complex with a vinyl-containing low-molecular organopolysiloxane. When compounded with an appropriate amount of such a platinum catalyst, the polysiloxane composition can be cured by heating, for example, for around 30 minutes at a temperature of 70° to 150° C.

Since the above mentioned platinum compoubnds each have a very high activity for the hydrosilation reaction between silicon-bonded vinyl groups and silicon-bonded hydrogen atoms, an organopolysiloxane composition comprising a vinyl-containing organopolysiloxane and an organohydrogenpolysiloxane with admixture of a platinum catalyst has a disadvantage that the addition reaction proceeds even at room temperature at a considerably high velocity so that the composition cannot be stored over months due to occurrence of an increase in the consistency or gelation which may take place already within 24 hours at room temperature.

A conventional countermeasure to solve the above mentioned problem of low storability is that the ingredients of the composition are divided in a two-package formulation into two groups forming separate packages, the content in each of which is prolongedly storable, and the contents of the two packages are mixed together immediately before use of the completed composition. Such a two-package formulation is of course disadvantageous because of the troublesomeness of the blending work necessitated before each time of use and the troubles due to an eventual inaccurate mixing proportion or incomplete mixing of the contents of the two packages. Alternatively, the composition is prepared in a one-package formulation but with further admixture of a reaction retarder such as a metal salt of an organic acid and an acetylenic alcohol, e.g., 3-methyl-1-butyn-3-ol, 1-ethynyl-1-cyclohexanol and the like. The addition of a reaction retarder is also undesirable because such a retarder compound is not an inherently essential component of the composition eventually to affect the properties of the composition after curing. Instead of the addition of a reaction retarder, it is proposed that the composition prepared in a one-package formulation is stored at a low temperature of, for example, $-20°$ C. or even lower although this method is, needless to say, far from practicability.

SUMMARY OF THE INVENTION

The present invention accordingly has an object, in order to solve the above described problems and disadvantages in the prior art, to provide a novel and improved organosiloxane-based composition curable by the mechanism of the hydrosilation reaction and still capable of being prolongedly stored at room temperature over several months or even longer without an increase in the consistency or gelation to be used with good workability.

Thus, the curable organosiloxane-based composition of the present invention is a uniform blend which comprises:

(a) an organosiloxane represented by the general formula

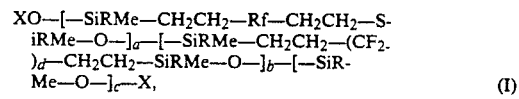

(I)

in which the subscript a is a positive integer in the range from 2 to 300, the subscript b is zero or a positive integer not exceeding 300, the subscript c is zero or a positive integer not exceeding 5000, the subscript d is a positive integer in the range from 2 to 8, Me is a methyl group, R is an unsubstituted or substituted monovalent hydrocarbon group free from aliphatic unsaturation, X is a triorganosilyl group having three monovalent hydrocarbon groups bonded to a silicon atom, of which at least one is an aliphatically unsaturated hydrocarbon group, and Rf is a perfluoroalkylene group or a perfluoroalkylene polyether group having not more than 30 carbon atoms represented by the general formula

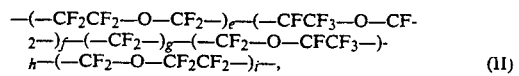

(II)

the subscripts e and i each being zero or 1, the subscripts f and h each being zero or a positive integer not exceeding 5 and the subscript g being zero or a positive integer not exceeding 8;

(b) an organohydrogenpolysiloxane represented by the general formula

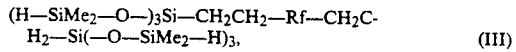

(III)

in which Me and Rf each have the same meaning as defined above, in an amount sufficient to provide from 1.0 to 4.0 moles of the silicon-bonded hydrogen atoms per mole of the aliphatically unsaturated hydrocarbon groups in the organosiloxane polymer as the component (a); and (c) a complex compound of rhodium in a catalytic amount.

DETAILED DESCRIPTION OF THE PREFERRED EMBODIMENTS

As is described above, the curable composition of the invention based on an organosiloxane polymer comprises, as the essential ingredients, the above defined components (a), (b) and (c), of which the component (b), i.e. an organohydrogenpolysiloxane having silicon-bonded hydrogen atoms, serves as a crosslinking agent of the component (a), i.e. an organosiloxane polymer having aliphatically unsaturated hydrocarbon groups bonded to the silicon atoms, by the hydrosilation reaction while the component (c) serves as a catalyst to accelerate the addition reaction between the components (a) and (b).

The component (a), i.e. an organosiloxane polymer having aliphatically unsaturated hydrocarbon groups bonded to the silicon atoms, is represented by the general formula

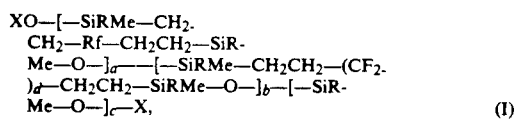

$$XO-[-SiRMe-CH_2-CH_2-Rf-CH_2CH_2-SiRMe-O-]_a-[-SiRMe-CH_2CH_2-(CF_2)_d-CH_2CH_2-SiRMe-O-]_b-[-SiRMe-O-]_c-X, \quad (I)$$

in which each symbol is defined as given above. In particular, the symbol R denotes a monovalent hydrocarbon group selected, each independently from the others, from the group consisting of alkyl groups such as methyl, ethyl, propyl and butyl groups, cycloalkyl groups such as cyclohexyl group and aryl groups such as phenyl and tolyl groups as well as those substituted hydrocarbon groups obtained by replacing a part or all of the hydrogen atoms in the above named hydrocarbon groups with substituents such as halogen atoms, cyano groups and the like exemplified by chloromethyl, 3,3,3-trifluoropropyl and 2-cyanoethyl groups.

The group denoted by Rf in the general formula (I) is a divalent group which is a perfluoroalkylene group or a perfluoroalkylene polyether group represented by the general formula $$-(-CF_2CF_2-O-CF_2-)_e-(-CFCF_3-O-CF_2-)_f-(-CF_2-)_g-(-CF_2-O-CFCF_3-)_h-(-CF_2-O-CF_2CF_2-)_i-, \quad (II)$$

in which each subscript has the meaning as defined above, having not more than 30 carbon atoms. When the subscripts e, i, f and h are each equal to zero, the subscript g cannot be equal to zero so that the group Rf is a perfluoroalkylene group.

The group denoted by X at each of the molecular chain ends of the organosiloxane polymer is a triorganosilyl group having three monovalent hydrocarbon groups bonded to the silicon atom, of which at least one is an aliphatically unsaturated hydrocarbon group such as vinyl and allyl groups or, preferably, a vinyl group while the remainder of the three groups, if any, can be exemplified by those given above as the examples of the group denoted by R.

Following are several structural formulas expressing the compounds suitable as the component (a), which, however, are given merely for the purpose of exemplification:

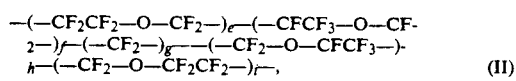

Vi—SiMe₂—O—(SiMe₂—CH₂CH₂—CF₂CF₂—O—CF₂—

—CFCF₃—O—CF₂-(-CF₂-)-CF₂—O—CFCF₃—CF₂—O—

—CF₂CF₂—CH₂CH₂—SiMe₂—O)₂₀—SiMe₂—Vi;

Vi—SiMe₂—O-(-SiMe₂—CH₂CH₂—CFCF₃—O-(-CF₂-CFCF₃—O)₃

-(-CF₂-)₂O—CFCF₃—CH₂CH₂—SiMe₂—O)₂₀—SiMe₂—Vi;

and

Vi—SiMe₂—O-(-SiMe₂—CH₂CH₂—CFCF₃—O—

-(-CF₂—CFCF₃—O)₃-(-CF₂-)₂O—CFCF₃—CF₂—

—O—CFCF₃—CH₂CH₂—SiMe₂—O)₂₀-(-SiMe₂—CH₂CH₂—

-(-CF₂)₆CH₂CH₂—SiMe₂—O)₂—SiMe₂—Vi, in which Me is a methyl group and Vi is a vinyl group.

The component (b) is represented by the general formula

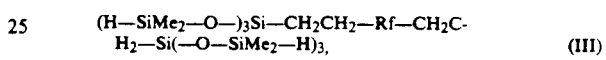

$$(H-SiMe_2-O-)_3Si-CH_2CH_2-Rf-CH_2CH_2-Si(-O-SiMe_2-H)_3, \quad (III)$$

which is a perfluoroalkylene or perfluoroalkylene polyether compound denoted by Rf having the same meaning as defined above and terminated at each molecular chain end with 2-tris(dimethylsiloxy)silyl ethyl group of the formula (H—SiMe₂—O—)₃Si—CH₂CH₂— so that a molecule of the compound has 6 hydrogen atoms directly bonded to the respective silicon atoms. A non-limitative example of the compound as the component (b) is the compound expressed by the following structural formula:

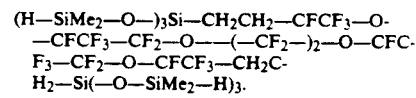

(H—SiMe₂—O—)₃Si—CH₂CH₂—CFCF₃—O—
—CFCF₃—CF₂—O—(—CF₂—)₂—O—CFC-
F₃—CF₂—O—CFCF₃—CH₂-
CH₂—Si(—O—SiMe₂—H)₃.

The amount of the component (b) in the inventive composition should be sufficient to provide from 1.0 to 4.0 moles of the silicon-bonded hydrogen atoms therein per mole of the aliphatically unsaturated hydrocarbon groups or, in particular, vinyl groups in the component (a) in order that the density of crosslinks in the composition after curing can be within an appropriate range.

The component (c) in the inventive composition is a complex compound of rhodium which acts as a catalyst to promote the hydrosilation reaction between the components (a) and (b). Different from conventional platinum compounds as a catalyst for the hydrosilation reaction, it is a quite unexpected discovery that the reaction velocity between the above described specific components (a) and (b) can be almost completely suppressed at room temperature or lower temperatures while the catalytic activity can be exhibited at an elevated temperature to promote the reaction taking place at a moderately rapid velocity only when the catalyst is a specific rhodium complex and not a platinum compound.

Suitable complex compounds of rhodium include, for example, tris(triphenylphosphine) rhodium chloride of the formula (Ph₃P)₃RhCl, in which Ph is a phenyl group, rhodium acetate dimer of the formula [(Me-COO)₂Rh]₂, in which Me is a methyl group, and rhodium acetylacetonate of the formula Rh(acac)₂, in which acac is an acetylacetonato group forming a ring structure with the rhodium atom, though not particularly limitative thereto. These complex compounds of rhodium as the component (c) are each solid at room temperature so that it is preferable that the rhodium compound is admixed with the components (a) and (b) as well as other optional ingredients in the form of a solution prepared beforehand by dissolving the rhodium compound in a suitable organic solvent in a concentration of, for example, 1 to 5% by weight though not particularly limitative thereto. The organic solvent used for this purpose is selected from the standpoint of good solubilizing power to the rhodium compound as well ast inertness to the catalytic activity of the rhodium compound and good miscibility with the other ingredients. Examples of suitable organic solvents include benzene, tol-uene, tetrahydrofuran, chloroform and the like.

The amount of the catalytic rhodium compound as the component (c) in the inventive composition should be sufficiently large to cause substantial acceleration of the reaction. For example, the amount should be at least $1.0 \times 10^{-4}$ mole as rhodium per mole of the aliphatically unsaturated hydrocarbon groups or vinyl groups in the component (a). Preferably, the amount of the component (c) is in the range from 0.001 to 0.1 mole as rhodium per mole of the aliphatically unsaturated hydrocarbon groups or vinyl groups in the component (a).

The curable composition of the present invention can be obtained by uniformly blending the above described essential components (a), (b) and (c) each in a specified amount. It is of course optional that the composition is further admixed with various kinds of known additives conventionally used in curable organopolysiloxane-based compositions including, for example, reinforcing fillers such as fumed and precipitated silica fillers, non-reinforcing fillers such as diatomaceous earth, finely pulverized quartz powders, carbon black and calcium carbonate, heat-stabilizers, antioxidants, adhesion aids, pigments and the like each in a limited amount.

When a filler or, in particular, a reinforcing filler is compounded in the composition, a preferable procedure for the preparation of the inventive composition is that the filler is first compounded with the component (a) alone in a kneader or on a two-roller mill at an elevated temperature or compounded at room temperature followed by a heat treatment of the compound to give a filled organosiloxane polymer-based compound which is, after cooling, then blended with the components (b) and (c) as well as with other optional ingredients according to need.

The curable organosiloxane polymer-based composition of the present invention prepared in the above described manner can be rapidly cured when it is heated at a temperature in the range from 70° to 150° C. or at a temperature higher than 90° C. or, preferably, higher than 110° C. within a relatively short time of 15 minutes or even shorter by means of the hydrosilation reaction taking place between the components (a) and (b) while, when it is kept at room temperature, the composition exhibits great stability without showing a noticeable increase in the consistency or without causing gelation retaining the flowability and, consequently, workability as prepared even after several months.

When fully cured, the composition of the invention is converted into a rubbery elastomer having excellent resistance against organic solvents and chemicals presumably as a consequence of the so high fluorine contents in both of the components (a) and (b) so that the inventive curable composition has usefulness as a sealant and coating agent as well as for the preparation of various kinds of molded and shaped articles of which the above mentioned features are very important.

In the following, the curable organosiloxane polymer-based composition of the invention is illustrated in more detail by way of examples and comparative examples, in which the term of "parts" always refers to "parts by weight".

EXAMPLE 1.

A curable organosiloxane polymer-based composition was prepared by manually blending 100 parts of a fluorocarbon siloxane polymer having silicon-bonded vinyl groups and expressed by the formula

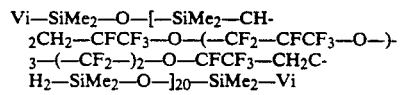
Vi—SiMe$_2$—O—[—SiMe$_2$—CH$_2$CH$_2$—CFCF$_3$—O—(—CF$_2$—CFCF$_3$—O—)$_3$—(—CF$_2$—)$_2$—O—CFCF$_3$—CH$_2$CH$_2$—SiMe$_2$—O—]$_{20}$—SiMe$_2$—Vi with 15 parts of a fumed silica filler after a surface treatment with hexamethyl disilazane followed by a heat treatment and thorough kneading on a three-roller mill and by further admixture of the blend with 4.65 parts of a fluorocarbon siloxane polymer having silicon-bonded hydrogen atoms and expressed by the formula

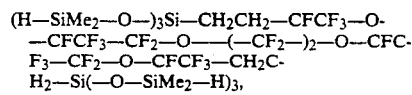
(H—SiMe$_2$—O—)$_3$Si—CH$_2$CH$_2$—CFCF$_3$—O—CFCF$_3$—CF$_2$—O—(—CF$_2$—)$_2$—O—CFCF$_3$—CF$_2$—O—CFCF$_3$—CH$_2$CH$_2$—Si(—O—SiMe$_2$—H)$_3$, 0.47 part of carbon black and 4.75 parts of a chloroform solution of tris(triphenylphosphine) rhodium chloride in a concentration of 1% by weight.

A rectangular molding frame was filled with the thus prepared composition after deaeration under reduced pressure and the composition was further deaerated in the frame and compression molded by heating at 150° C. for 15 minutes under a pressure of 120 kgf/cm$^2$ to give a cured rubber sheet having a thickness of 2 mm, from which test specimens were taken by punching. Measurements of the mechanical properties of these test specimens were undertaken according to the procedure specified in JIS K 6301 to give the results including: 47 kgf/cm$^2$ of the tensile strength; 3 kgf/cm of the tear strength; 260% of the ultimate elongation at break; 45 of the hardness in the JIS A scale; 47% of the elastic resilience; and 1.568 g/cm$^3$ of the density.

The curable composition was subjected to the test of storage stability by keeping in a hermetically sealable container at room temperature or at 40° C. not to find any increase in the viscosity or appearance of a gelled matter even after 3 months of storage at room temperature or after 2 weeks of storage at 40° C.

EXAMPLES 2 TO 8 AND COMPARATIVE EXAMPLE.

A master compound was prepared by manually blending 100 parts of a fluorocarbon siloxane polymer having silicon-bonded vinyl groups and expressed by the formula

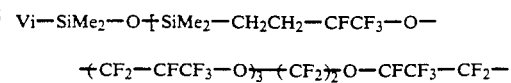
Vi—SiMe$_2$—O—(—SiMe$_2$—CH$_2$CH$_2$—CFCF$_3$—O—(—CF$_2$—CFCF$_3$—O—)$_3$—(—CF$_2$—)$_2$—O—CFCF$_3$—CF$_2$—

-continued

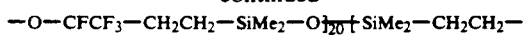

with 12 parts of a fumed silica filler after a surface treatment with hexamethyl disilazane followed by a heat treatment and thorough kneading on a three-roller mill and by further admixture of the blend with 4.65 parts of the same fluorocarbon siloxane polymer having silicon-bonded hydrogen atoms as used in Example 1.

In each of Examples 2 to 8, the above prepared master compound was further admixed with a solution of one of the rhodium compounds specified below to give a curable composition.

Rhodium compound

I: tris(triphenylphosphine) rhodium chloride
II: rhodium acetate dimer
III: rhodium acetylacetonate Table 1 below indicates the rhodium compound, the organic solvent used for dissolving the rhodium compound, the concentration of the rhodium compound in the solution in % by weight and the amount of addition of the solution.

In Comparative Example, 0.1 part of an isopropyl alcohol solution of chloroplatinic acid in a concentration of 2% by weight as platinum was used in place of the rhodium catalyst solution.

Each of the thus prepared curable compositions was subjected to the curing test by heating at 150° C. for 15 minutes in the same manner as in Example 1 to find that the curability was as good as in Example 1 in all of the compositions.

Further, the curable compositions were subjected to the storage stability test in the same manner as in Example 1 at room temperature and at 40° C. The results were that the storage stability of each of the compositions in Examples 2 to 8 was as good as in Example 1 while the composition in Comparative Example was found to have been solidified after 1 month storage at room temperature or after 1 week storage at 40° C.

TABLE 1

| Example No. | Rhodium compound | Solvent used | Concentration, % by wt. | Amount added, parts |
|---|---|---|---|---|
| 2 | I | toluene | 1 | 4.75 |
| 3 | I | chloroform | 1 | 4.75 |
| 4 | II | tetrahydrofuran | 0.5 | 4.54 |
| 5 | II | chloroform | 0.25 | 9.08 |
| 6 | III | toluene | 2 | 1.03 |
| 7 | III | benzene | 2 | 1.03 |
| 8 | III | chloroform | 1 | 2.05 |

What is claimed is:

1. A curable organosiloxane-based composition which comprises, as a uniform blend:
    (a) an organosiloxane polymer represented by the general formula

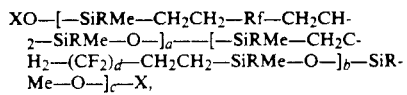

in which the subscript a is a positive integer in the range from 2 to 300, the subscript b is zero or a positive integer not exceeding 300, the subscript c is zero or a positive integer not exceeding 5000, the subscript d is a positive integer in the range from 2 to 8, Me is a methyl group, R is an unsubstituted or substituted monovalent hydrocarbon group free from aliphatic unsaturation, X is a triorganosilyl group having three monovalent hydrocarbon groups bonded to a silicon atom, of which at least one is an aliphatically unsaturated hydrocarbon group, and Rf is a perfluoroalkylene group or a perfluoroalkylene polyether group having not more than 30 carbon atoms represented by the general formula

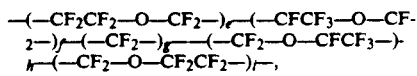

the subscripts e and i each being zero or 1, the subscripts f and h each being zero or a positive integer not exceeding 5 and the subscript g being zero or a positive integer not exceeding 8 wherein if e, f, h and i are each equal to zero, g cannot be equal to zero so that Rf is a perfluoroalkylene group;
    (b) an organohydrogenpolysiloxane represented by the general formula

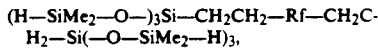

in which Me and Rf each have the same meaning as defined above, in an amount sufficient to provide from 1.0 to 4.0 moles of the silicon-bonded hydrogen atoms per mole of the aliphatically unsaturated hydrocarbon groups in the organosiloxane polymer as the component (a); and
    (c) a complex compound of rhodium in a catalytic amount selected from the group consisting of tris(triphenylphosphine) rhodium chloride of the formula $(Ph_3P)_3RhCl$, in which Ph is a phenyl group, rhodium acetate dimer of the formula $[(MeCOO)_2Rh]_2$, in which Me is a methyl group, and rhodium acetylacetonate of the formula $Rh(acac)_2$, in which acac is an acetylacetonato group forming a ring structure with the rhodium atom.

2. The curable organosiloxane-based composition as claimed in claim 1 in which the aliphatically unsaturated hydrocarbon group in the component (a) is a vinyl group.

3. The curable organosiloxane-based composition as claimed in claim 1 in which the amount of the complex compound of rhodium as the component (c) is at least $1.0 \times 10^{-4}$ mole as rhodium per mole of the aliphatically unsaturated hydrocarbon groups in the component (a).

4. The curable organosiloxane-based composition as claimed in claim 1 in which the amount of the complex compound of rhodium as the compo-nent (c) is in the range from 0.001 to 0.1 mole as rhodium per mole of the aliphatically unsaturated hydrocarbon groups in the component (a).

* * * * *